UNITED STATES PATENT OFFICE.

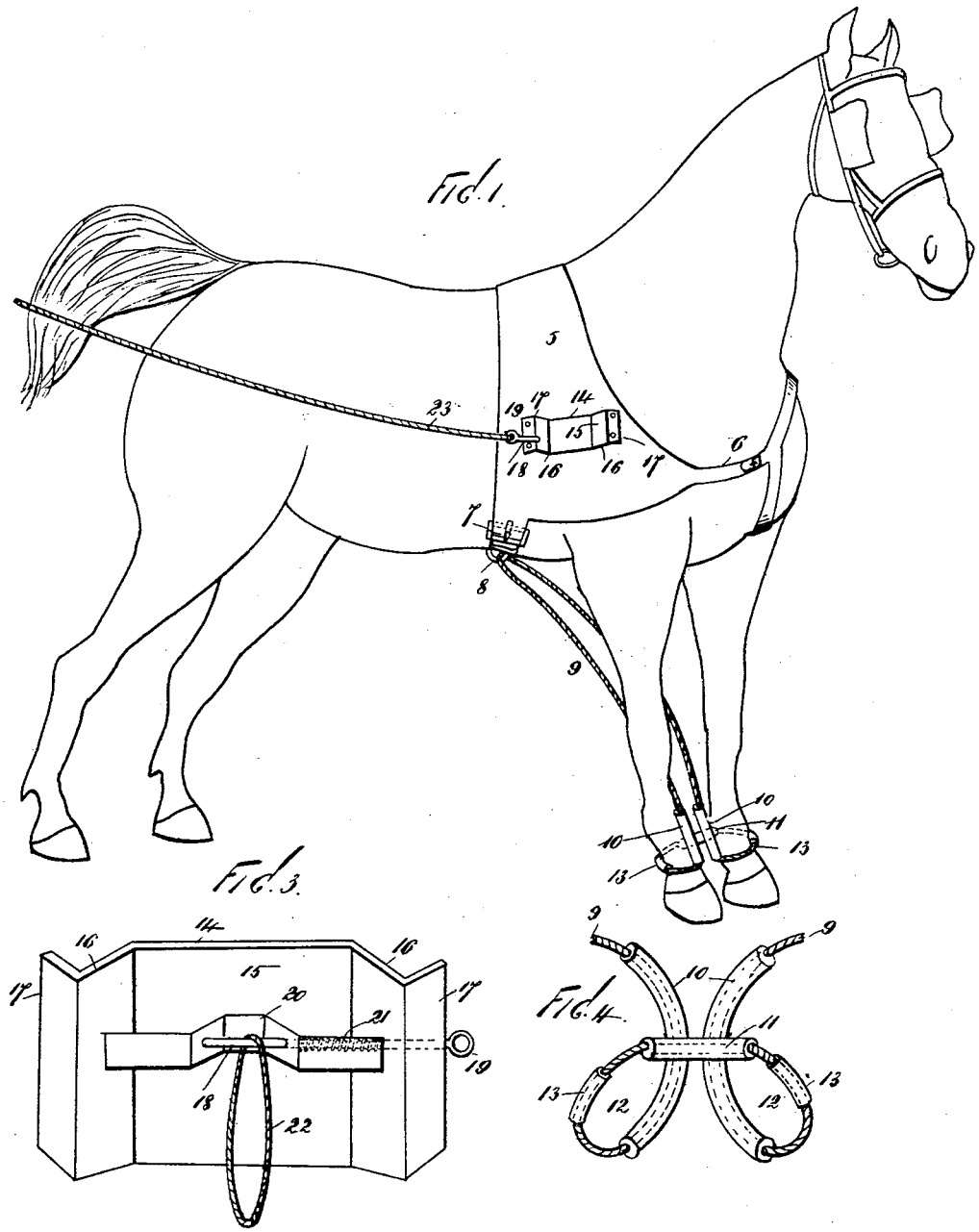

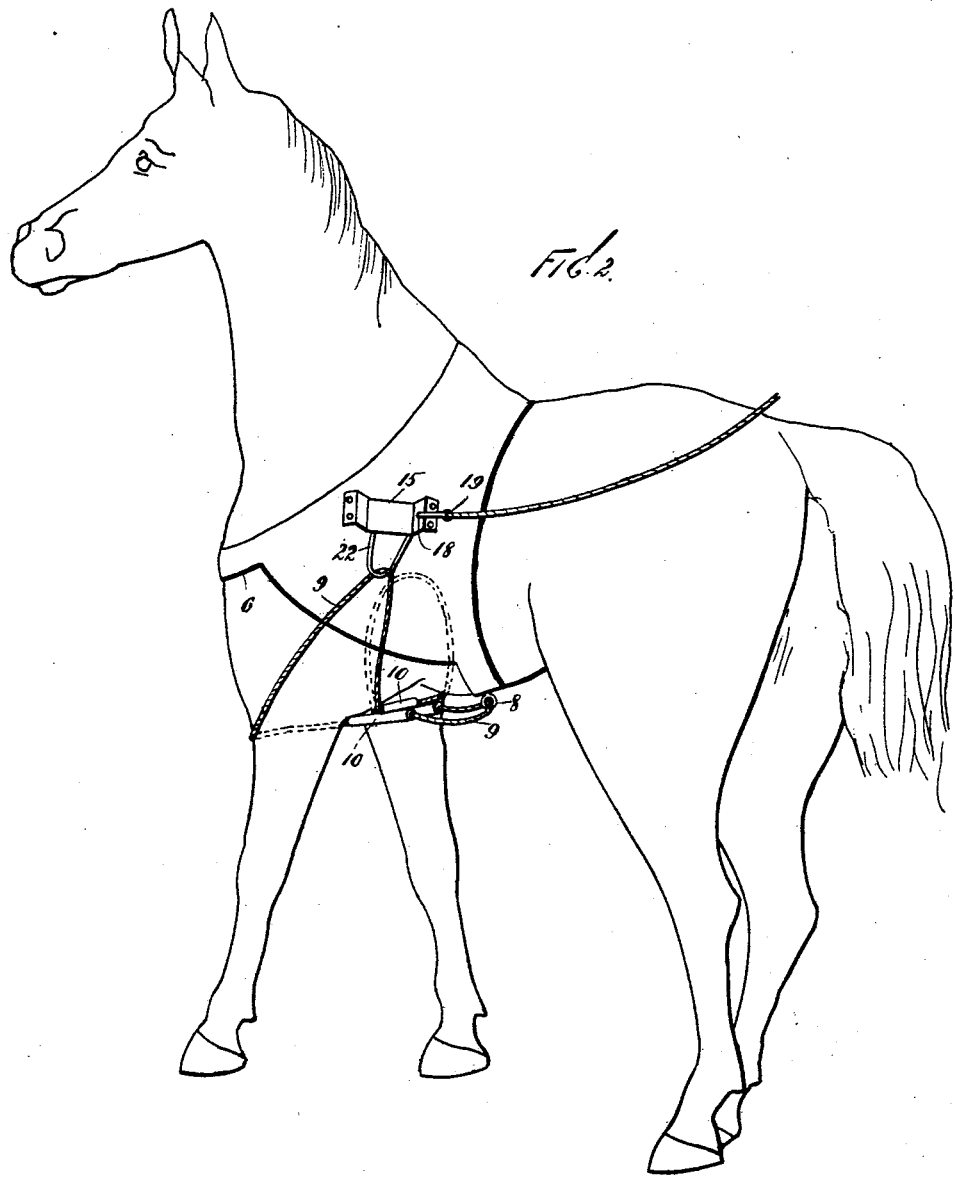

DAVID S. MINTON, OF NEW YORK, N. Y.

HOPPLE FOR HORSES.

SPECIFICATION forming part of Letters Patent No. 591,866, dated October 19, 1897.

Application filed June 24, 1896. Serial No. 596,768. (No model.)

*To all whom it may concern:*

Be it known that I, DAVID S. MINTON, a citizen of the United States, and a resident of New York, in the county of New York and State of New York, have invented certain new and useful Improvements in Hopples or Stopping Devices for Horses, of which the following is a specification, reference being had to the accompanying drawings, forming a part thereof, in which similar numerals of reference indicate corresponding parts wherever found throughout the several views.

This invention relates to means for stopping a horse, or for preventing a horse from running away, either when used in harness or under saddle; and the object of the invention is to provide a simple and effective device for this purpose which may be applied to the horse in connection with an ordinary harness or in connection with the girths of a saddle; and with these and other objects in view the invention consists in the construction, combination, and arrangement of parts hereinafter described and claimed.

The invention is fully disclosed in the following specification, of which the accompanying drawings form a part, in which—

Figure 1 represents a horse provided with my improved apparatus showing the same in position to prevent the horse from running; Fig. 2, a similar view showing the position of the apparatus before the horse starts to run; Fig. 3, an inside view of a locking attachment which forms a part of the apparatus, and Fig. 4 a detail view of a part of said apparatus.

In the drawings forming part of this specification I have shown my invention applied to a horse by means of a wide strap or band 5, which is passed over the back of the animal, and the lower front corners of which are buckled over the breast, as shown at 6, while the lower rear corners are also connected at 7, by a strap or in any desired manner, and secured to this strap is a ring 8, through which passes a rope, cord, or other device 9. I also provide a hopple attachment consisting of two curved or segmental tubes 10, and a cross-tube 11, which is secured thereto, and the rope, cord, or chain 9 is passed through one of these tubes, and then passed through the cross-tube, and then through the opposite tube 10, as clearly shown in Fig. 4, whereby loops 12 are formed, and mounted on the rope, cord, or chain 9, or that portion thereof which forms the loops 12, are elastic or rubber tubes 13.

The tubes 10 and 11 are composed of metal, preferably of lead, and the rope, cord, or chain 9 is preferably made endless in form, but it may be composed of two parts and may be connected with the ring 8 in any desired manner, or it may be passed loosely through said ring.

In practice the horse's feet are passed through the loops 12, in the direction shown by the arrows in Fig. 4, and as clearly shown in Fig. 1, and the object of the elastic tubes 13 is to prevent the loops from cutting the legs, and I also provide attachments 14, which are secured to the strap or band 5, one at each side, as shown in Figs. 1 and 2, and these attachments consist of plates 15, having inwardly-directed end pieces 16, which are provided with outwardly-directed flanges 17, and passing through the end pieces 16 is a bolt 18, provided at its rear end with a ring 19, and said bolt passes through a U-shaped bracket 20, one of which is secured in each of the attachments 14, and each of the bolts is provided with a spring 21, one end of which is connected therewith and the other with the rear end piece 16 of the attachment, and the operation of these springs is to force the bolts 18 inwardly, and I also provide loops 22, as shown in Fig. 2, which are passed over the central portion of said bolts, and which are adapted to be connected with the rope, cord, or chain 9. Each of the bolts 18 is provided with a line 23, which extends backwardly, and which is under the control of the driver, and which may be connected with a vehicle or the dashboard thereof in any desired manner, and if the device is applied to a saddle, any suitable strap or other device may be substituted for these lines, and be connected with the saddle in any desired manner, so as to be under the control of the rider.

The normal position of the apparatus is that shown in Fig. 2, in which the hopple attachment (shown in Fig. 4) is supported directly back of the fore legs of the horse and under the breast, and if the animal attempt to run, all that is necessary is to pull on the lines 23, when the loops 22 will be released from the bolts 18, and the rope, cord, or chain 9, which supports the hopple attachment, will be released therefrom, and said attachment will drop into the position shown in Fig. 1. It will be evident that the horse cannot run with the hopple attachment in this position, the rope, cord, or chain 9, which forms the loops 12, being closely drawn around the ankles of the animal, thus holding the hopple attachment in the position shown in said figure, in which the feet will be held together, and the control thereof, by the horse, will be to an extent lost.

By means of this device a runaway horse may be quickly and easily stopped, and it will be apparent that the supplemental loop 22 need not necessarily be employed, as the rope, cord, or chain 9 may, under certain circumstances, be carried upwardly and connected directly with the rods or bolts 18, and the locking attachment 15 may be placed low enough to permit of this operation, if desired.

My invention is not limited to the exact form, construction, and arrangement of the various parts, as herein described, and I reserve the right to make all such alterations therein, and modifications thereof, as fairly come within the scope of the invention.

Having fully described my invention, I claim as new and desire to secure by Letters Patent—

Means for stopping horses consisting of a wide strap or band adapted to pass over the back of said horse and having the lower end thereof buckled over the breast of the same, a strap secured to the lower rear corner of the said band, a ring fastened thereto, a rope passing through said ring, two segmental tubes, a cross-tube secured thereto, said rope passing in succession through said tube and cross-tube and forming thereby loops, elastic or rubber tubes mounted on said rope, plates having inwardly-directed end pieces secured to said band, outwardly-directed flanges engaging said band, a bolt passing through one of said end pieces, a ring at the rear portion thereof, U-shaped brackets engaging said bolt and the said plates, a spring on said bolt in connection therewith, other loops secured to the central portion of said bolts in connection with said rope, a line engaging said bolts adapted to operate the same, said parts being in combination substantially as described.

In testimony that I claim the foregoing as my invention I have signed my name, in presence of the subscribing witnesses, this 18th day of June, 1896.

DAVID S. MINTON.

Witnesses:
W. W. HILL,
CHARLES S. ROGERS.